Nov. 29, 1955   W. H. WOODWORTH   2,725,520
ELECTRICAL ERROR DETECTOR
Filed Nov. 4, 1954
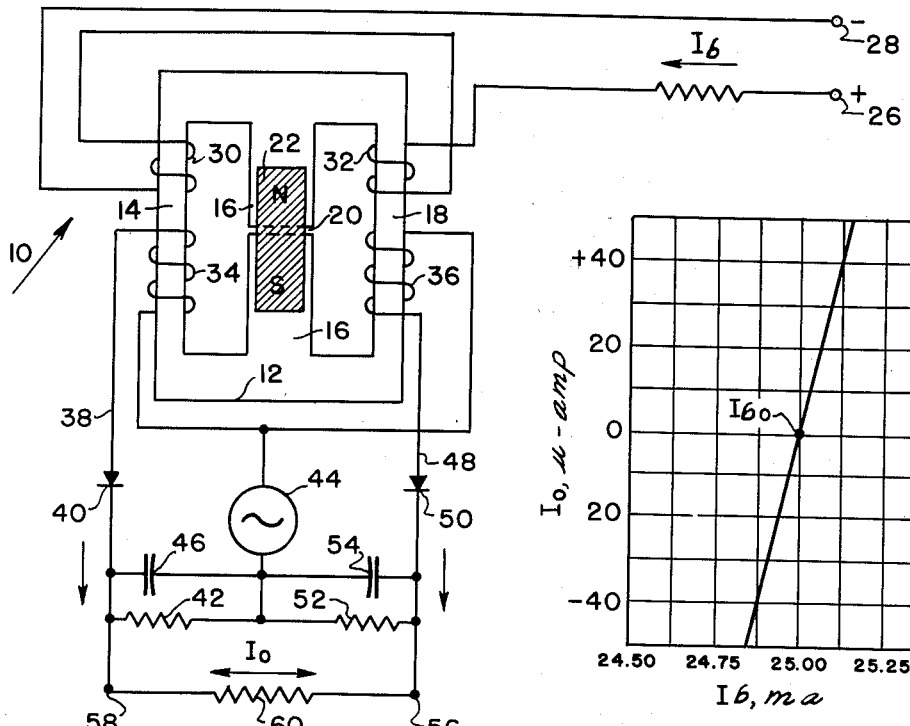
Fig. 1.
Fig. 2.
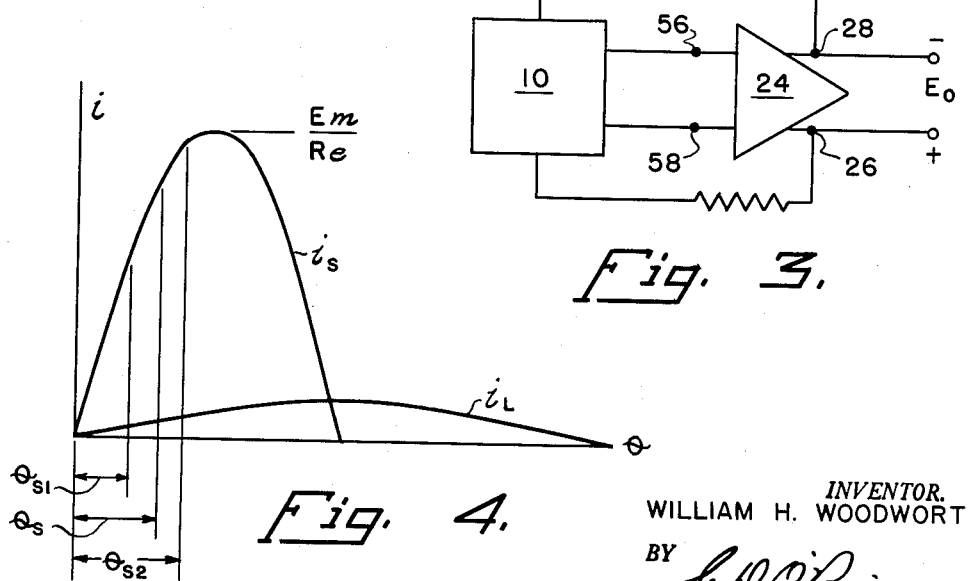
Fig. 3.
Fig. 4.
INVENTOR.
WILLIAM H. WOODWORTH
BY
G. D. O'Brien
V. C. Muller
ATTORNEYS

United States Patent Office 2,725,520
Patented Nov. 29, 1955

2,725,520

ELECTRICAL ERROR DETECTOR

William H. Woodworth, China Lake, Calif., assignor to the United States of America as represented by the Secretary of the Navy Application November 4, 1954, Serial No. 466,956

5 Claims. (Cl. 323—89)

(Granted under Title 35, U. S. Code (1952), sec. 266)

The invention described herein may be manufactured and used by or for the Government of the United States of America for governmental purposes without the payment of any royalties thereon or therefor.

This invention relates to electrical measuring devices, and in particular to an electrical error detector, a device for producing an electrical quantity which is a function of the deviation, or error, of a D. C. current, or voltage, from a desired value. In radar systems, analogue computers, etc., sources of constant direct current, or voltage, are required for reference purposes. In the past one such source of reference current or voltage has comprised an error detector and an amplifier which together form a closed loop reference supply of either constant voltage or constant current. Previously known electrical erorr detectors have included glow discharge tubes, carbon pile regulators, etc. The accuracy of such error detectors has not been as great as desired, and this together with the unreliability of such devices when subjected to wide variations in temperature and to large accelerations has limited their use.

It is, therefore, an object of this invention to provide an improved error detector which provides an electrical signal which is a function of the deviation of a D. C. current, or voltage, from a predetermined constant value.

It is another object of this invention to provide an error detector for a reference unit which is highly accurate in operation.

It is a further object of this invention to provide an error detector for a reference unit which is reliable and accurate when subjected to large variations in temperature and to large accelerations.

It is a still further object of this invention to provide an error detector for a reference unit which employs only electrical and magnetic elements which are inherently rugged and stable.

Other objects and many of the attendant advantages of this invention will be readily appreciated as the same become better understood by reference to the following detailed description when considered in connection with the accompanying drawings wherein:

Fig. 1 is a schematic diagram of an electrical error detector,

Fig. 2 is a graph showing the variation of the output current, Io, of the error detector with respect to the reference current, Ib, Fig. 3 is a schematic diagram of a reference unit, and Fig. 4 illustrates the half cycle wave forms of the current through the A. C. windings of the error detector.

Referring now to Fig. 1, in which a preferred form of the invention is illustrated, electrical error detector 10 has a saturable core 12 which is made, in a preferred form, of laminated magnetic material. Core 12 has three legs, 14, 16 and 18, the cross sectional area of the outer legs 14 and 18 is made considerably smaller than the cross sectional area of the middle leg 16 and the remainder of the core. The middle, or inner leg 16, has an airgap 20 formed therein. Permanent magnet 22 is mounted with respect to leg 16, with one pole of the magnet on one side of the airgap 20 and the other pole of the magnet on the other side. To permit stable operation over wide ambient temperature ranges, magnet 22 is made of "Alnico II" in a preferred form of the invention. Reference current $I_b$ from a source such as a magnetic amplifier but not limited to such a source, flows from terminal 26 to terminal 28 through bias winding 30, which is placed around leg 14 and bias winding 32 which is placed around leg 18. Bias windings 30, 32 are connected in series and each has $N_b$ turns. The direction of flow of current $I_b$ and the direction in which windings 30, 32 are wound on legs 14, 18 are chosen so that the magnetic flux in legs 14, 18 due to magnet 22 is opposed by the magnetic flux produced in legs 14, 18 by current $I_b$ flowing through bias windings 30, 32.

To produce output current $I_o$, the error signal of the error detector, A. C. winding 34 is placed around leg 14 and A. C. winding 36 is placed around leg 18. Each of the windings 34, 36 has $N_c$ turns. The electrical circuit for energizing winding 34 forms loop 38 which includes winding 34, diode 40, resistor 42 and A. C. source 44. Resistor 42 is shunted by condenser 46. The electrical circuit for energizing winding 36 forms loop 48 which includes winding 36, diode 50, resistor 52 and source 44. Condenser 54 shunts resistor 52. Condensers 46 and 54 present a low A. C. impedance across resistors 42, 52 and also serve to increase the average voltage across resistors 42 and 52. Resistors 42, 52 are chosen so each has a resistance of $R_L$. The resistances of coils 34, 36 are made equal, and the characteristics of the diodes 40, 50 are matched. The capacitances of condensers 46, 54 are likewise equal. The error signal, current $I_o$, between terminals 56, 58 can be applied to the control winding of a conventional high gain magnetic amplifier 24. The resistance of the control winding is indicated symbolically by resistor 60 in Fig. 1 which has a resistance of $R_m$. The direction which diodes 40, 50 permit current to flow through loops 38, 48 and the direction of the windings 34, 36 about legs 14, 18 are chosen so that the pulsating magnetic flux produced by the current flowing through coil 34 will add to the non-pulsating, or steady state, flux due to magnet 22 in leg 14 and will oppose the flux due to magnet 22 in leg 18, for example. Diodes 40, 50 permit current flow through coils 34, 36 during the same half cycle.

When the magnetomotive force across the outer legs 14, 18 due to reference current $I_b$ flowing through bias coils 30, 32 equals the magnetomotive force across legs 14, 18 due to the permanent magnet 22, the two steady state fields will oppose, or nullify each other, so that a zero magnetic field exists in legs 14, 18. During the half cycle when current is permitted to flow through A. C. windings 34, 36 by diodes 40, 50, the legs 14, 18 will become saturated at the same angle of the half cycle. The magnitude of the output voltage $E_m$ of source 44, the magnitude of $N_c$, the magnitude of the frequency $f$, of source 44, and the cross sectional area of legs 14, 18 are chosen so that legs 14 and 18 will saturate at some angle during the half cycle when current flows through coils 34, 36. At the time legs 14, 18 become saturated, the impedances of coils 34, 36 will drop to a low value which is determined by the resistance of coils 34, 36, and there will be a large increase in the value of the current flowing in loops 38, 48. However, since the time at which legs 14, 18 saturate is the same, and because the resistance of the corresponding components of loops 38, 48 are chosen to be equal, the current flowing through loop 38 will equal the current flowing through loop 48 and the voltage across resistors 42, 52 will be equal. Thus no voltage will exist between terminals 56 and 58. The value of $I_b$ at which the output current $I_o$ is equal to 0 is $I_{bo}$ as seen in Fig. 2.

If reference current $I_b$ is greater than $I_{bo}$ then the steady state magnetomotive force across outer legs 14, 18 due to coils 30, 32 will be greater than the steady state magnetomotive force across outer legs 14, 18 due to magnet 22, and a net steady state magnetic field of one direction, or polarity, will exist in leg 14 and an equal steady state magnetic field in the same direction, or of the same polarity, will exist in leg 18. The pulsating magnetic flux due to current flowing in coil 36, for example, will add to the steady state flux due to the reference current $I_b$ in coil 32 which will cause leg 18 to saturate at some time, or at some angle of the half cycle. The magnetic flux due to the current in coil 34 will oppose the steady state flux due to the reference current $I_b$ flowing through coil 30 and leg 14 will saturate at a later time, or at a larger angle of the half cycle. Thus the time at which the leg 18 saturates precedes the time at which leg 14 saturates. Since leg 18 saturates earlier than leg 14, a larger average current will flow through loop 48 than flows through loop 38. This causes the potential drop across resistor 52 to be greater than the potential drop across resistor 42. As a result, terminal 56 will have an average D. C. potential that is higher than that of terminal 58, and current $I_o$ will flow through the load resistor 60 in a direction from terminal 56 to terminal 58. When the value of $I_b$ is less than $I_{bo}$, the situation is reversed and the average D. C. potential of terminal 58 will be greater than that of terminal 56. As a result the output current $I_o$ will flow from terminal 58 to terminal 56 through load resistor 60.

In order for the error detector to operate as described above, the magnitudes of the magnetomotive forces produced by A. C. coils 34, 36 at which legs 14, 18 saturate, must vary differentially as a function of the steady state magnetomotive forces existing across legs 14, 18. Middle leg 16 provides a return path for the magnetic flux produced by bias coils 30, 32 and permits the times during the half cycles at which legs 14, 18 saturate, or the phase angles at which legs 14, 18 saturate, to vary differentially. If middle leg 16 provided a very low reluctance path, practically all the magnetic flux due to magnet 22 would pass through leg 16 and substantially no magnetomotive force would exist across the outer legs 14 and 18 due to magnet 22. It is, therefore, necessary that the reluctance of leg 16 have some reasonable value. This is achieved by airgap 20. The size of airgap 20 is selected so that its reluctance is from one-tenth to ten times the reluctance of either of the outer legs 14, 18. The cross sectional area of legs 14, 18 are made from one-third to one-half the cross sectional area of the remainder of core 12 in a preferred example so that these legs may be readily saturated.

Referring now to Fig. 1 and to loop 38, for example, the current in loop 38, neglecting the effect of condenser 46 and assuming that the D. C. resistance of the components of loop 38 is small compared with the unsaturated impedance of coil 34, is (1) $$i = \frac{E_m}{\omega L}(1 - \cos \omega t)$$

where $E_m$ is the peak value of the voltage of source 44, L is the inductance of either of coils 34, 36 when legs 14, 18 are unsaturated and $\omega = 2\pi f$, where $f$ is the frequency of source 44.

Let $i_0$ be the magnitude of the current which will just saturate leg 14, assuming that no steady state magnetic field exists in leg 14, or that no steady state magnetomotive force exists across leg 14. If $\theta_s$ is the angle in the A. C. half cycle when saturation occurs then, (2) $$\theta_s = \cos^{-1}\left\{1 - i_0 \frac{\omega L}{E_m}\right\}$$

The current $i_d$ is defined as the change in the current required to saturate the core leg 14 if there is a net steady state magnetomotive force across leg 14. Current $i_d$ is given by (3) $$i_d = \frac{F_m}{N_c} - \frac{I_b N_b}{N_c}$$

where $F_m$ is the magnetomotive force across leg 14. All of the reluctance is assumed to be across the outer legs 14, 18, since the core area of the remainder of the core is made considerably larger. If $F_m$ does not equal $N_b I_b$ the saturation angles will be changed differentially, as follows:

(4) $$\theta_{s1} = \cos^{-1}\left\{1 - (i_0 - i_d)\frac{\omega L}{E_m}\right\}$$

(5) $$\theta_{s2} = \cos^{-1}\left\{1 - (i_0 + i_d)\frac{\omega L}{E_m}\right\}$$

Referring to Fig. 4, in which the half cycle wave forms are illustrated, when leg 14 saturates the current in loop 38 is limited by the series resistance in that loop. The current flowing when leg 14 is unsaturated is represented by $i_L$ and the current when the core is saturated is represented by $i_S$. Legs 14, 18 saturate at angles $\theta_{s1}$ and $\theta_{s2}$. Therefore, the area bounded by $\theta_{s1}$, $\theta_{s2}$ and $i_S$ approximately determines the D. C. output of error detector 10. It follows then that the output current $I_o$ will be given by (6) $$I_o = \tfrac{1}{2}\pi \int_{\theta_{s1}}^{\theta_{s2}} \frac{E_m}{R_e} \sin \theta\, d\theta = \frac{i_d \omega L}{\pi R_e}$$

where $R_e$ is the equivalent D. C. resistance around each of the loops 38, 48. $R_e$ contains factors to account for current division between $R_L$ and $R_M$ and is given by (7) $$R_e = \frac{R_c}{R_L}(2R_L + R_m) + R_L + R_m$$

where $R_c$ is the sum of the D. C. resistance of the components of loop 38 including the forward resistance of diode 40. Combining Equations 3 and 6 gives (8) $$I_o = \frac{(F_m - I_b N_b)\omega L}{\pi N_c R_e}$$

and substituting for $R_e$ in Equation 8 gives the output current (9) $$I_o = \frac{(F_m - I_b N_b)\omega L}{\left\{\frac{R_c}{R_L}(2R_L + R_m) + R_L + R_m\right\}\pi N_c}$$

From Equation 9 it is clear that the output current $I_o$, or the error signal, is independent of the magnitude of the voltage from source 44 so long as the legs 14 and 18 are saturated some time during the A. C. half cycle when current flows through A. C. windings 34, 36. $I_o$ is a linear function of $I_b$ going through a zero value which is determined by $F_m$ and $N_b$. The value of $I_b$ that causes a zero value of $I_o$ is not effected by the frequency of the source 44. The error detector 10 is nearly independent of the core material used provided that it is conveniently saturable.

In a preferred embodiment the following values for the circuit components were used:

Resistors 42, 52_____ 2K ohms.
Condensers 46, 54_____ 4 microfarads.
Diodes 40, 50_____ Matched germanium diodes type IN 63.

Operation of the invention has been described in terms of reference current $I_b$ and output current $I_o$. However, because D. C. voltages and currents are related by Ohm's law, it is very easy to convert from current to voltage inputs and outputs if desired. Therefore, the error detector can be used for either voltage or current inputs or outputs.

It is, of course, obvious that the desired reluctance of middle leg 16 could be achieved by the use of magnetic material having a higher reluctance than that of the remainder of the core 12. Similarly the outer legs 14, 18 could be made of different material to provide saturation at reasonably low magnetomotive force levels by the use of different material rather than by reducing the cross sectional area. It is also possible to replace the permanent magnet 22 with an electromagnetic source of magnetomotive force. Also the invention can be used as a transducer which produces an output current which is a function of the angular position of the magnet 22 with respect to leg 16, if magnet 22 is rotatably mounted with respect to center leg 16.

Obviously many modifications and variations of the present invention are possible in the light of the above teachings. It is, therefore, to be understood that within the scope of the appended claims the invention may be practiced otherwise than as specifically described.

What is claimed is:

1. An electromagnetic device comprising a saturable core having three legs, first means for producing substantially constant and equal magnetomotive forces across two of said legs, said magnetomotive forces being of a given polarity, second means for producing substantially constant equal magnetomotive forces across said two legs, the magnetomotive forces produced by said second means being of the opposite polarity to that of the magnetomotive forces produced across said legs by said first means, first loop means for producing periodically a magnetomotive force across one of said two legs, and second loop means for producing periodically a magnetomotive force across the other of said two legs, the polarity of the periodically produced magnetomotive force of the first loop producing a magnetomotive force across one leg of one polarity and the polarity of the pulsating magnetomotive force across the other of said two legs produced by said second loop being of opposite polarity, said pulsating magnetomotive forces saturating said legs at some time during each time the pulsating magnetomotive forces are produced, said pulsating magnetomotive forces saturating said legs at the same time when the steady state magnetomotive forces across said legs by said first and second means are equal and at different times when the steady state magnetomotive forces across said first and second legs are unequal, and means for producing a current whose potential and magnitude are determined by the difference in times of saturation of said legs.

2. An error detector comprising a core having three legs, a permanent magnet mounted with respect to said core for producing across two of the legs of said core substantially equal and constant magnetomotive forces of a given direction, electrical circuit means for producing substantially equal magnetomotive forces across the outer two legs of said core of a direction opposite to that produced by the magnet, which magnetomotive forces are a function of the D. C. current flowing in said electrical circuit means, and means for producing an electrical signal which is a function of the difference between the magnitudes of the magnetomotive forces across the outer two legs of the core produced by the permanent magnet and the magnetomotive forces produced across the outer two legs of the core by the electrical circuit means.

3. An error detector comprising a saturable core having three legs, an inner leg and two outer legs, a permanent magnet mounted with respect to said inner leg and producing across said outer legs substantially constant and equal magnetomotive forces of a given polarity, electrical circuit means about said outer legs of said core for producing magnetomotive forces across said legs which are a function of the D. C. current flow in said circuit means and which magnetomotive forces are equal to each other and of opposite polarity to that produced by said permanent magnet, and means for producing an electrical signal whose magnitude is a function of the difference between the magnitudes of the magnetomotive forces across the outer legs due to the permanent magnet and the electrical circuit means, and the polarity of which signal is determined by the relative magnitudes of the magnetomotive forces across the outer legs of said core.

4. A saturable core having two outer legs and an inner leg, the reluctance of the inner leg being from one-tenth to ten times the reluctance of either of the outer legs, a permanent magnet of substantially constant magnetomotive force mounted with respect to said middle leg to cause substantially equal magnetomotive forces to exist across said outer legs which magnetomotive forces have a given polarity, electrical circuit means mounted with respect to the outer legs of said core for producing substantially equal magnetomotive forces across the outer legs of said core which are substantially constant and whose polarity is opposite to that of the magnetomotive forces across said legs produced by said permanent magnet, and means for producing electrical signals whose polarity is determined by whether the magnetomotive forces across the outer legs due to the permanent magnet is greater or less than the magnetomotive forces due to the electrical circuit means, and whose magnitude is a function of the difference in the magnitudes of the magnetomotive forces across said outer legs.

5. A magnetic reference unit comprising a core of magnetic material having three legs, an airgap formed in the inner leg, the cross sectional area of the outer legs being less than the cross sectional area of the remainder of the core, a permanent magnet fixedly mounted with respect to the inner leg of the core and adapted to produce equal magnetic fields in each of the outer legs, a first pair of coils, one of said coils being around one of the outer legs of the core and the other of said coils being around the other outer leg, said coils being connected in series and adapted to have a D. C. bias current flow therethrough, the magnetic field produced by the bias current flowing through said coils opposing the fields in the outer legs due to the permanent magnet, a pair of loops having a common source of A. C. potential, the first loop comprising said source, a first resistor, a first current rectifier and a first coil, a first condenser shunting said first resistor, said second loop comprising said source, a second resistor, a second current rectifier, and a second coil, a second condenser shunting said second resistor, the coil of the first loop being around one outer leg of the core and the coil of the second loop being around the other outer leg of the core, said current rectifying means being connected to permit current to flow through each loop at the same time, the coils of said loops being wound in such a manner that the magnetic fields produced by the currents flowing therethrough add to the field produced by the permanent magnet in one outer leg of the core and oppose the field produced by the permanent magnet in the other outer leg of the core, whereby the D. C. output voltage obtained across the first and second resistors is a function of the magnitude of the current flowing through the first pair of coils.

References Cited in the file of this patent

UNITED STATES PATENTS

| | | |
|---|---|---|
| 2,053,154 | La Pierre | Sept. 1, 1936 |
| 2,694,178 | Smith | Nov. 9, 1954 |